(12) United States Patent
Chao et al.

(10) Patent No.: US 11,960,827 B1
(45) Date of Patent: Apr. 16, 2024

(54) FILLING FIELD ON USER INTERFACE BASED ON CONTENT OF MESSAGE

(71) Applicant: Google Inc., Mountain View, CA (US)

(72) Inventors: Thomas Chao, Burlingame, CA (US); Jeroen Jillissen, Campbell, CA (US); Govind Kaushal, San Francisco, CA (US); Prasenjit Sarkar, Sunnyvale, CA (US); Deanna Carey, San Jose, CA (US); Annika Matta, Mountain View, CA (US)

(73) Assignee: Google LLC, Mountain View, CA (US)

( * ) Notice: Subject to any disclaimer, the term of this patent is extended or adjusted under 35 U.S.C. 154(b) by 703 days.

(21) Appl. No.: 15/144,126

(22) Filed: May 2, 2016

Related U.S. Application Data

(60) Provisional application No. 62/317,875, filed on Apr. 4, 2016.

(51) Int. Cl.
| | |
|---|---|
| *G06F 3/0481* | (2022.01) |
| *G06F 3/0484* | (2022.01) |
| *G06F 16/958* | (2019.01) |
| *G06F 40/14* | (2020.01) |
| *G06F 40/174* | (2020.01) |
| *H04L 9/40* | (2022.01) |
| *H04L 67/02* | (2022.01) |
| *H04L 67/306* | (2022.01) |

(52) U.S. Cl.
CPC ......... *G06F 40/174* (2020.01); *G06F 3/0481* (2013.01); *G06F 3/0484* (2013.01); *G06F 16/986* (2019.01); *G06F 40/14* (2020.01); *H04L 63/083* (2013.01); *H04L 67/02* (2013.01); *H04L 67/306* (2013.01)

(58) Field of Classification Search
CPC ...... G06F 16/986; G06F 40/14; G06F 3/0481; G06F 3/0484; H04L 63/083; H04L 67/02; H04L 67/306
IPC .......................................... G06F 17/243,3/0481
See application file for complete search history.

(56) References Cited

U.S. PATENT DOCUMENTS

| | | | |
|---|---|---|---|
| 7,418,656 B1 * | 8/2008 | Petersen | G06F 17/241 715/230 |
| 2006/0059434 A1 * | 3/2006 | Boss | G06F 17/243 715/780 |

(Continued)

OTHER PUBLICATIONS

Christian Zibreg; How to disable suggested contacts on iOS and Mac; http://www.idownloadblog.com/2015/10/22/how-to-disable-mail-contact-suggestions-iphone-mac/; Oct. 22, 2015; 12 pages.

(Continued)

*Primary Examiner* — Kyle R Stork
(74) *Attorney, Agent, or Firm* — Brake Hughes Bellermann LLP

(57) ABSTRACT

A non-transitory computer-readable storage medium may comprise instructions stored thereon. When executed by at least one processor, the instructions may be configured to cause a computing system to at least present a user interface of an application in association with a user account, the user interface including at least one fillable field, determine a content type of the at least one fillable field, search messages stored in association with the user account for a text string associated with the content type of the at least one fillable field, and fill the at least one fillable field with the text string.

1 Claim, 9 Drawing Sheets

(56) References Cited

U.S. PATENT DOCUMENTS

| | | | | |
|---|---|---|---|---|
| 2008/0083017 | A1* | 4/2008 | Lulich | G06F 21/41 |
| | | | | 726/4 |
| 2010/0138485 | A1* | 6/2010 | Chow | G06F 17/30902 |
| | | | | 709/203 |
| 2014/0222702 | A1* | 8/2014 | Jennings | G06Q 50/01 |
| | | | | 705/319 |
| 2015/0058161 | A1* | 2/2015 | Gura | G06Q 10/087 |
| | | | | 705/26.8 |
| 2015/0381703 | A1* | 12/2015 | Mahamuni | H04L 67/025 |
| | | | | 709/217 |

OTHER PUBLICATIONS

Formstack Social Autofill—Google+; https://support.formstack.com/customer/portal/articles/1754621; 6 pages.

* cited by examiner

| URL 252 | Content type 254 |
|---|---|
| www.domain.com | Account identifier, password |
| www.rendor.com/login | User ID |
| . . . | . . . |

256 → (row 2 left)  
258 ← (row 2 right)  
260 → (row 3 left)  
262 ← (row 3 right)

Content Type Table 250

FIG. 2B

FILLING FIELD ON USER INTERFACE BASED ON CONTENT OF MESSAGE

RELATED APPLICATIONS

This application is a non-provisional of, and claims priority to, U.S. Provisional Application No. 62/317,875, filed Apr. 4, 2016, entitled "Filling Field on User Interface Based on Content of Message," the disclosure of which is incorporated herein in its entirety.

TECHNICAL FIELD

This description relates to webpages with fillable fields.

BACKGROUND

Applications, including browsers displaying webpages, may have fields for users to fill in with information such as account numbers or passwords. It may be time-consuming and cumbersome for users to retrieve this information.

SUMMARY

According to an example, a non-transitory computer-readable storage medium may comprise instructions stored thereon. When executed by at least one processor, the instructions may be configured to cause a computing system to at least present a user interface of an application in association with a user account, the user interface including at least one fillable field, determine a content type of the at least one fillable field, search messages stored in association with the user account for a text string associated with the content type of the at least one fillable field, and fill the at least one fillable field with the text string.

According to an example, a non-transitory computer-readable storage medium may comprise instructions stored thereon. When executed by at least one processor, the instructions may be configured to cause an application running on a computing system to at least present a user interface in association with a user account, the user interface including at least one fillable field, determine a content type of the at least one fillable field, send a request to an email server associated with the user account for a text string associated with the content type of the at least one fillable field, receive the text string from the email server associated with the user account, and fill the at least one fillable field with the text string.

According to an example, a non-transitory computer-readable storage medium may comprise instructions stored thereon. When executed by at least one processor, the instructions may be configured to cause an operating system running on a computing system to at least receive, from a browser application, a browser request for a text string, the browser request including a domain name and a content type, in response to receiving the browser request, send a system request to a message application, the system request including the domain name and the content type, receive the text string from the message application, and send the text string to the browser application.

According to an example, a computing system may comprise means for presenting a user interface of an application in association with a user account, the user interface including at least one fillable field, means for determining a content type of the at least one fillable field, means for searching messages stored in association with the user account for a text string associated with the content type of the at least one fillable field, and means for filling the at least one fillable field with the text string.

According to an example, an application running on a computing system may comprise means for presenting a user interface in association with a user account, the user interface including at least one fillable field, means for determining a content type of the at least one fillable field, means for sending a request to an email server associated with the user account for a text string associated with the content type of the at least one fillable field, means for receiving the text string from the email server associated with the user account, and means for filling the at least one fillable field with the text string.

According to an example, an operating system running on a computing system may comprise means for receiving, from a browser application, a browser request for a text string, the browser request including a domain name and a content type, means for, in response to receiving the browser request, sending a system request to a message application, the system request including the domain name and the content type, means for receiving the text string from the message application, and means for sending the text string to the browser application.

The details of one or more implementations are set forth in the accompanying drawings and the description below. Other features will be apparent from the description and drawings, and from the claims.

BRIEF DESCRIPTION OF THE DRAWINGS

FIG. 2B shows a table for determining content types of fields based on Uniform Resource Locators (URLs) according to an example implementation.

DETAILED DESCRIPTION

Information for filling fields in applications including browsers displaying webpages, such as user accounts and/or passwords, may be included in messages, such as emails, that users receive. It can be cumbersome for users to search through their messages to find the information to fill in the fields. With the user's permission, a computing system may search through the user's messages to find the information, and enter the information into the fields. Finding the information for the user may save the user time, and may save computing resources by obviating the need to present messages to the user for the user to search through to find the information.

Figure 1A:
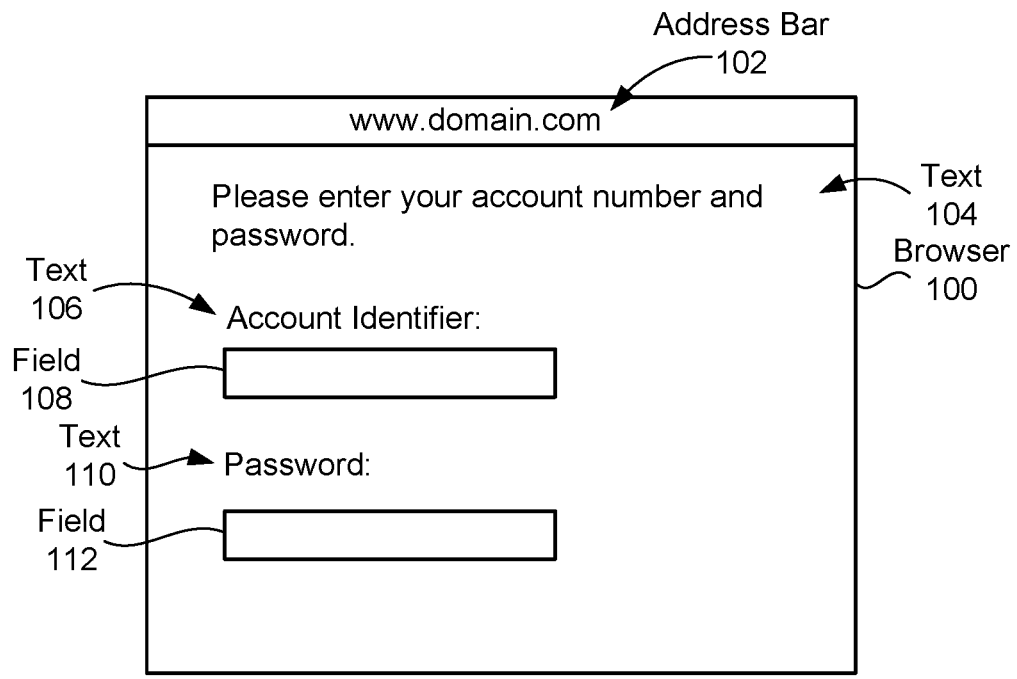
FIG. 1A shows a browser presenting a webpage according to an example implementation.

FIG. 1A shows a browser 100 presenting a webpage according to an example implementation. The browser 100 is an example of an application which may have fillable fields that may be filled based on content of messages. Other applications may include applications downloaded onto a computing system such as a desktop computer, laptop computer, or smartphone, which require a user to fill in a field, such as a user identifier and/or passcode.

In the example in which the application is a browser 100, which may be included on a computing system such as a desktop computer, laptop computer, or smartphone, the browser 100 may include an address bar 102 displaying a Uniform Resource Locator (URL) (e.g., "www.domain.com") used by the browser 100 to retrieve the webpage. The browser 100 may display, based on rendering code from the webpage, text 104 (e.g., "Please enter your account number and password."), text 106 (e.g., "Account number:") proximal to and/or preceding a fillable field 108, and additional text 110 (e.g., "Password") proximal to and/or preceding another fillable field 112. Other types of applications, such as gaming applications, financial applications, automobile sharing applications, or airfare scheduling applications, may also display text proximal to and/or preceding fillable fields. A user may have received the information, in the form of text strings to fill in the fields 108, 112, in messages, such as emails. A computing system may use the text 106 proximal to and/or preceding the field 108 to determine a content type of the field 108, and may use the text 110 proximal to and/or preceding the field 112 to determine a content type of the field 112.

Figure 1B:
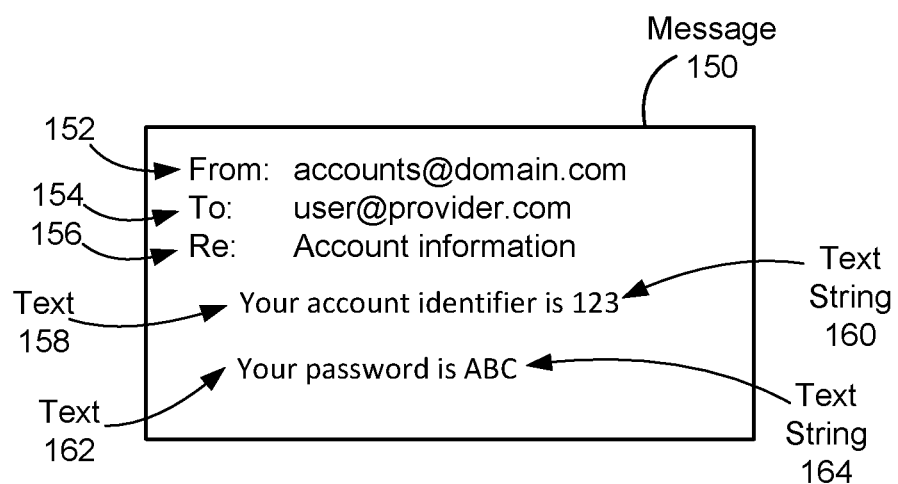
FIG. 1B shows a message according to an example implementation.

FIG. 1B shows a message 150 according to an example implementation. The message 150 may include an email. A server may have sent the message 150 to a user with account information so that the user may log into a webpage, such as the webpage shown in FIG. 1A, associated with the server. The message 150 may include a from field 152 identifying a sender of the message 150. A domain of the address of the sender (in this example, "domain") may match a domain of the webpage and/or a domain of the URL ("www.domain.com") associated with the webpage for which information will be retrieved to fill a field, such as the webpage shown in FIG. 1A.

The message 150 may include a to field 154 including an address, such as an email address, of the user. The message 150 may include a subject line 156 indicating a subject of the message 150, in this example, "Account information".

The message 150 may include text 158, such as, "Your account identifier is 123," which may include a text string 160, "123," for filling the field 108 of the webpage. The text 158 may include text, in this example, "account identifier," adjacent to, preceding, and/or proximal to, the text string 160, which may match the content type of the field 108 and/or that the computing system may use to find the text string 160 matching the content type.

The message 150 may include text 162, such as, "Your password is ABC," which may include a text string 164, "ABC," for filling the field 112 of the webpage. The text 162 may include text, in this example, "password," adjacent to, preceding, and/or proximal to, the text string 164, which may match a content type of field 112 and/or that the computing system may use to find the text string 164 matching the content type.

Figures 1C, 2A:
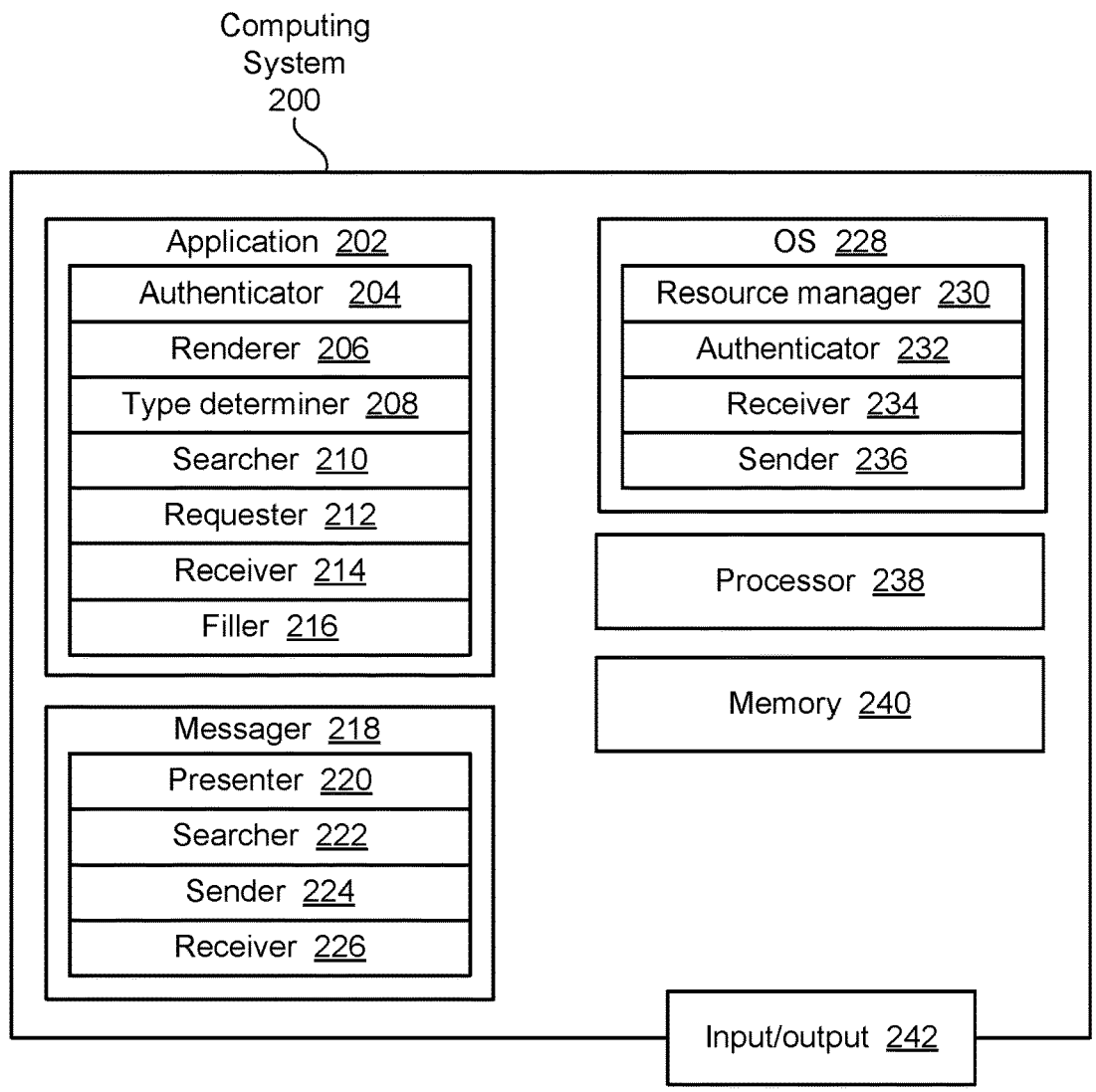
FIG. 1C shows code for rendering the webpage shown in FIG. 1A according to an example implementation.
FIG. 2A shows a computing system according to an example implementation.

FIG. 1C shows code 170 for rendering the webpage shown in FIG. 1A according to an example implementation.

In an example implementation, the code 170 may include Hypertext Markup Language (HTML) code. Code for rendering the text 106, 110 and fields 108, 112 may also be written in other languages, such as Java, C++, C#, or Swift, as non-limiting examples.

The code 170 may include a form notation 172 (e.g., "<form>") indicating that the code 170 is for generating a form. The code 170 may include a line 174, including text, such as "Please enter your account identifier and password," and a line break indicator, <br>, for generating the text 104 shown in FIG. 1A.

The code 170 may include line 176, which includes text, such as "Account number:," and line break indicator <br>, for generating the text 106. The line 176 may precede an input element defining an input field for text input and a name attribute.

The code 170 may include a line 178 for generating the field 108. The line 178 may include the input element, such as "input type='text'", defining the input field 108 for text input, and may define a name attribute, such as "name='accountidentifier'", and may include a line break indicator, <br>. The name attribute may cause the webpage, when rendered by the browser 100, to receive a value entered into the input field 108. The computing system may determine the content type of the field 108 based on the name attribute, "accountidentifier". The computing system may, for example, determine that the name attribute, "accountidentifier", included in the code 170, is similar to and/or matches the text, "account identifier", included in the text 158 of the message 150.

The code 170 may include line 180, which includes text, such as "Password:," and line break indicator <br>, for generating the text 110. The line 180 may precede an input element defining an input field for text input and a name attribute.

The code 170 may include a line 182 for generating the field 112. The line 182 may include an input element, such as "input type='text'", defining the input field 112 for text input, and may define a name attribute, such as "name='password'", and may include a line break indicator, <br>. The name attribute may cause the webpage, when rendered by the browser 100, to receive a value entered into the input field 112. The computing system may determine the content type of the field 112 based on the name attribute, "password". The computing system may, for example, determine that the name attribute, "password", included in the code 170, is similar to and/or matches the text, "password", included in the text 162 of the message 150. The code 170 may also include a form notation 184 (e.g. "</form>") indicating an end of the form.

FIG. 2A shows a computing system 200 according to an example implementation. The computing system 200 may perform any of the functions, methods, and/or techniques described above with respect to a computing system. Functions, methods, and/or techniques described with respect to the computing system 200 may be performed by any combination of a remote server accessed by a client device and the client device operated by the user.

The computing system 200 may include an application 202. The application 202 may be a browser or other application that requires a user to enter text into fillable fields. In an example in which the application 202 is a browser, the application 202 may render code and/or content, such as HTML code 170 shown in FIG. 1C, into webpages browsable by a user such as the webpage shown in FIG. 1A. In examples in which the application 202 is another type of application, the application 202 may render and/or present text and fillable fields to a user.

The application 202 may include an authenticator 204. The authenticator 204 may authenticate and/or log in a user and/or user account for a session with a server hosting the webpage, such as by a username and password, a token, or biometric authentication. The authenticator 204 may also ask for a user's permission to fill fields on a webpage based on information included in messages associated with the user's account.

The application 202 may include a renderer 206. The renderer 206 may render code and/or content, such as HTML code 170 shown in FIG. 1C, to generate a webpage and/or text and fillable fields, such as the text 106, 110 and fillable fields 108, 112 included in the webpage shown in FIG. 1A, with which a user can interact.

The application 202 may include a type determiner 208. The type determiner 208 may determine a content type of fillable fields, such as the fields 108, 112 shown in FIG. 1A. The type determiner 208 may determine the content type of the fields based on text 106, 110 proximal to, preceding, and/or adjacent to, the field 108, 112, such as within a predetermined number of characters, words, or tokens of the field 108, 112, based on a name attribute included in a line 178, 182 of code 170 for generating the field 108, 112, and/or based on a URL associated with the webpage. The type determiner 208 may determine the content type of the field based on the URL by checking a table, list, or other data structure stored in memory, as described further with respect to FIG. 2B.

The application 202 may include a searcher 210. In an example implementation, when the application 202 is presenting a webpage with one or more fillable fields and has determined the content type(s) of the one or more fillable fields, the searcher 210 may search messages associated with the user account authenticated by the authenticator 204 for a text string 160, 164 of the determined content type to fill the field 108, 112. The searcher 210 may search all messages associated with the user account, or only messages for which the domain name of the sender matches the domain name of the webpage. The searcher 210 may search for text strings adjacent to, proximal to (such as within a predetermined number of characters, words, or tokens), or succeeding, text matching and/or similar to the content type of the field. In an example implementation, the computing system 200 may have determined where the text strings 160, 164 are located within messages 150 for each URL. For example, a server serving and/or hosting a specific URL and/or domain may send users messages with their account identifiers and/or passwords, and place the text such as account identifiers and/or passwords in the same location in each email. The computing system 200 may have stored this location, and the searcher 210 may retrieve the text string from this stored location.

The application 202 may include a requester 212. In an example implementation, when the application 202 is presenting a webpage with one or more fillable fields, the requester 212 may request a text string to fill the fillable field. The requester 212 may send the request to a server that stores messages on behalf of the user account authenticated and/or logged into the application 202, or may send the request to an operating system 228 of the computing system 200, described below. The request may include the domain name and/or URL associated with the presented webpage, the content type of the fillable field, and/or the user account authenticated by and/or logged into the application 202.

The application 202 may include a receiver 214. The receiver 214 may receive the text string(s) 160, 164 sent to the application 202 by the server or operating system 228 in response to the request sent by the application 202.

The application 202 may include filler 216. The filler 216 may fill the field(s) 108, 112 with the text string 160, 164 searched and/our found by the searcher 210 or received by the receiver 214. The filler 216 may automatically fill the field(s) 108, 112 upon the searcher 210 finding the text string 160, 164 or the receiver 214 receiving the text string(s) 160, 164, or may prompt the user to accept filling the field(s) 108, 112 with the text string(s) 160, 164.

The computing system 200 may include a messager application 218. The messager application 218 may present, send, and receive messages, such as emails, on behalf of a user account. The messages may be received from persons, entities, and/or accounts other than the user's account, or from the user's account in an example in which the user sends messages to himself or himself to manually save information and/or create a task list for himself or herself in an inbox of the messager application 218. The messager application 218 may be a standalone application launched by the computing system 200, or may be a web application with functions performed by a webserver and output rendered by the application 202.

The messager application 218 may include a presenter 220. The presenter 220 may present messages, such as emails, to a user.

The messager application 218 may include a searcher 222. The searcher 222 may search for text strings 160, 164 matching content types to fill out fields 108, 112 of a webpage. The searcher 222 may search for the text strings 160, 164 using any of the methods, functions, or techniques described with respect to the searcher 210, such as text strings proximal to, adjacent to, and/or preceding text that is similar to the content type, or text strings in predetermined locations in the messages based on URLs and/or domain names associated with the webpage.

The messager 218 may include a sender 224. The sender 224 may send messages, such as emails, on behalf of a user account. The messager 218 may also include a receiver 226. The receiver 226 may receive messages, such as emails, on behalf of a user account.

The computing system 200 may include an operating system (OS) 228. The operating system 228 may manage resources and applications running on the computing system 200.

The operating system 228 may include a resource manager 230. The resource manager 230 may manage the resources of the computing system 200, such as by determining which applications may access computing resources such as a processor 238, memory 240, and input/output nodes 242, and when the applications may access the computing resources.

The operating system 228 may include an authenticator 232. The authenticator 232 may authenticate and/or log in a user account, such as by receiving a username and password, a token, or biometric information, so that a session is associated with the user account.

The operating system 228 may include a receiver 234. The receiver 234 may receive messages, such as requests for text strings and messages that include requested text strings.

The operating system 228 may include a sender 236. The sender 236 may send messages, such as requests for text strings which will be used to fill fields, and text strings.

The computing system 200 may include at least one processor 238. The at least one processor 238 may be capable of executing instructions, such as instructions stored in memory 240, to perform any combination of the functions, methods, and/or techniques described herein.

The computing system 200 may include at least one memory device 240. The memory device 240 may include a non-transitory computer-readable storage medium. The memory device 240 may include instructions. The instructions, when executed by at least one processor, such as the at least one processor 238, may cause the computing system 200 to perform any combination of the functions, methods, and/or techniques described herein. The memory device 240 may also store messages and associations between URLs and/or domain names and content types, as described below with respect to FIG. 2B.

The computing system 200 may include at least one input/output node 242. The input/output node 242 may include one or more input interfaces and one or more output interfaces. The input interfaces and output interfaces may include wired or wireless nodes for communicating with other computing systems, such as servers and mobile devices. The input interface(s) may include a keyboard, mouse, touchscreen, and/or microphone, as non-limiting examples. The output interface(s) may include a display and/or speaker, as non-limiting examples.

FIG. 2B shows a table 250 for determining content types of fields based on Uniform Resource Locators (URLs) according to an example implementation. The table 250 is an example of a data structure for storing an association between URLs 252 or domain names and content types 254. The computing system 200 may access this data structure to retrieve content types based on URLs and/or domain names associated with webpages, such as the webpage shown in FIG. 1A, which have fillable fields.

In the example table 250 shown in FIG. 2B, the table 250 includes a URL column 252 and a content type column 254. The computing system 200 may perform a query on the table 250 using a URL 256, 260 of a webpage and/or one or more fillable fields, and return one or more content types 258, 262 (in some examples in which a webpage has more than one fillable field 108, 112 that may be filled based on text strings included in messages, the query may return more than one content type 258, 262). The computing system 200 may use the returned content type to find a text string 160, 164 in a message 150 to fill the field(s) 108, 112.

In another example implementation, the content type table 250 may replace the URL column 252 with an application column. The content type table 250 may thereby match an application, such as gaming application, a financial application, an automobile sharing application, and/or an airfare scheduling application, with a content type for filling in fillable fields displayed by the application 202.

Figure 3A:
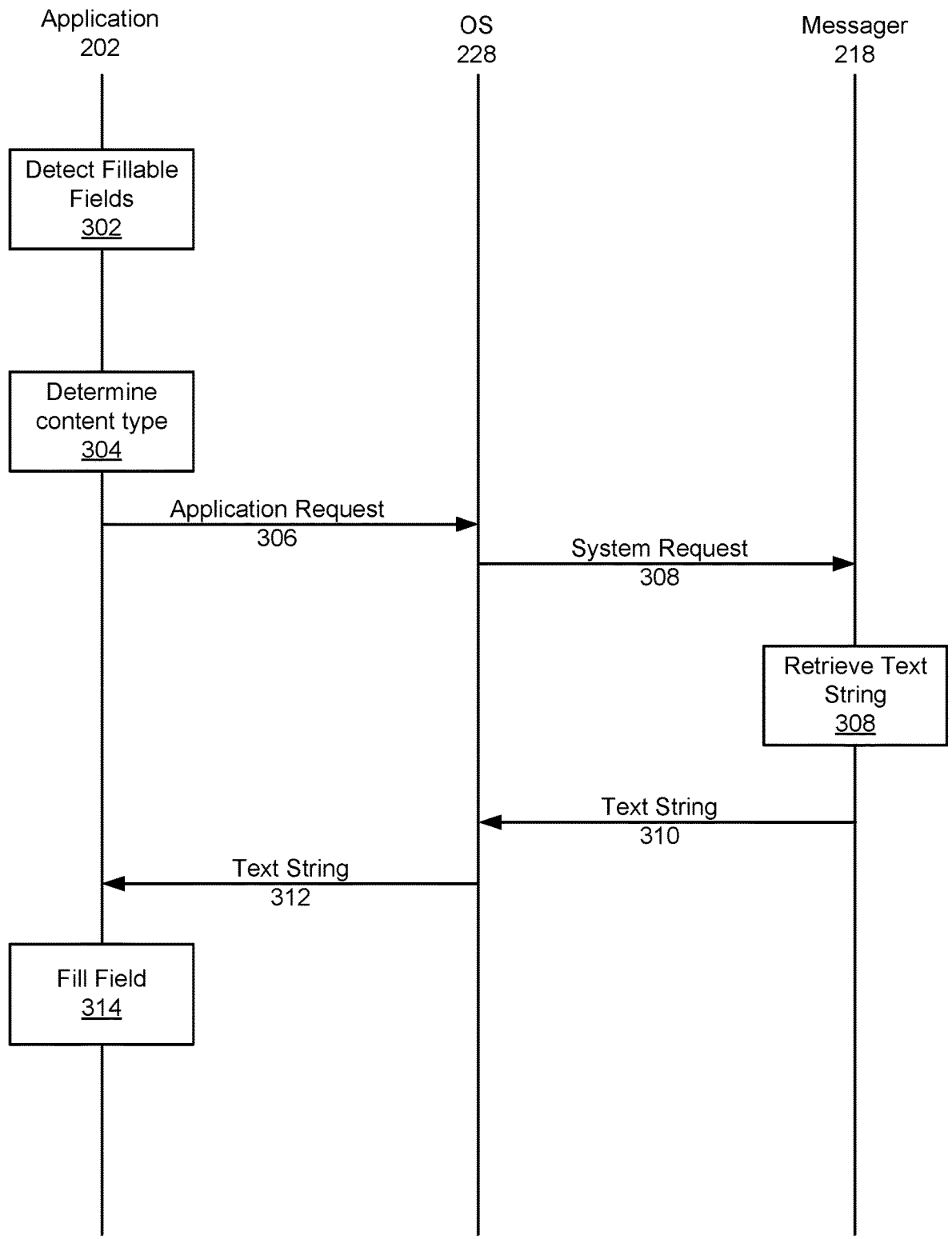
FIG. 3A shows a timing diagram for filling fields according to an example implementation.

FIG. 3A shows a timing diagram for filling fields according to an example implementation. The fields may be included in a webpage displayed by a browser application, or may be displayed by another type of application. In this example, the application 202 may detect one or more fillable fields (302). The application 202 may detect fillable fields 108, 112 based on the content of the webpage and/or based on code for textual input being included in the code 170 for rendering the webpage and/or displaying a user interface. The application 202 may detect the fillable fields 108, 112 (302) in response to a browser application rendering a webpage, in response to a user opening and/or launching the application 202, such as on a mobile phone, or in response to a predetermined input such as pressing a home button of a smartphone or other predetermined button or input for a predetermined time and/or a minimum threshold of time, pressing a predetermined button or input twice within a maximum period of time and/or entering a predetermined gesture into a touchscreen, as non-limiting examples.

Based on and/or in response to detecting fillable fields, the application 202 may detect a content type (304) of the fillable fields 108, 112. The application 202 may detect the content type based on text adjacent to, preceding, and/or proximal to the field(s) 108, 112 on the webpage and/or user interface of the application, based on a name attribute in code for receiving a value entered into the field 108, 112, based on a type or name of the application 202, and/or based on a URL or domain name associated with the webpage.

After determining the content type (304), the application 202 may send an application request 306 to the operating system 228. The application request 306 may request a text string(s) for filling the field(s) 108, 112. The application request 306 may include an identification of a user account, a content type(s) of the field(s) 108, 112, a type or name of the application 202, and/or a URL or domain name associated with the webpage.

The operating system 228 may respond to receiving the application request 306 from the application 202 by sending a system request 308 to a messager application 218. The messager application 218 may be implemented on the same computing system 200 as the application 202 and operating system 228, or on a remote server. The system request 308 may request the text string(s) for filling the field(s) 108, 112, and may include an identification of a user account, a content type(s) of the field(s) 108, 112, a type or name of the application 202, and/or a URL or domain name associated with the webpage.

In response to receiving the system request 308 from the operating system 228, the messager application 218 may retrieve the requested text string (308). The messager application 218 may retrieve and/or search for the requested text string using any of the methods, techniques, and/or functions described above.

After retrieving the text string (308), the messager application 218 may send the text string 310 to the operating system 228. In response to receiving the text string 310 from the messager application 218, the operating system 228 may send the text string 312 to the application 202. In response to receiving the text string 312 from the operating system 228, the application 202 may fill the field(s) 314 with the text string.

Figure 3B:
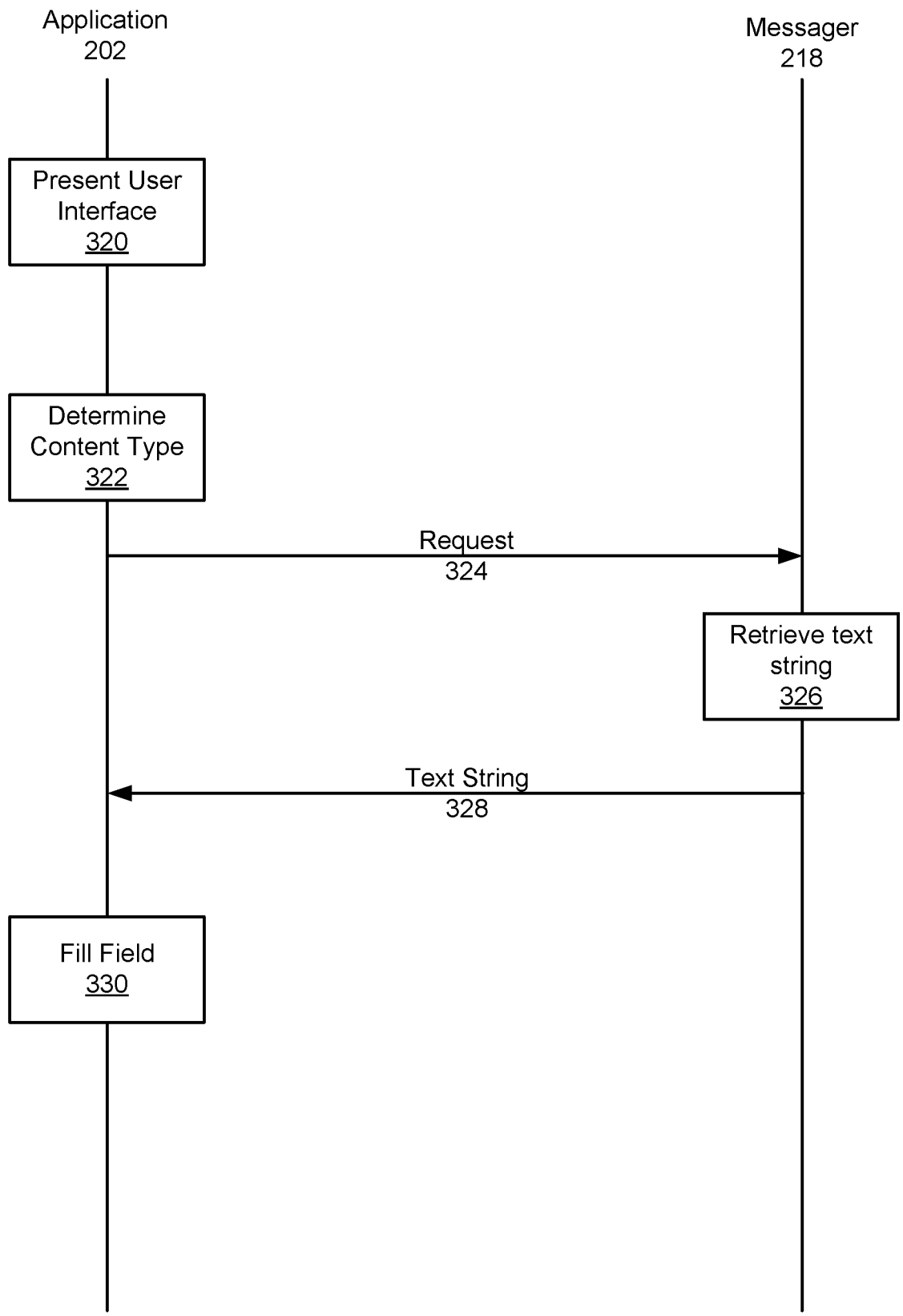
FIG. 3B shows a timing diagram for filling fields according to another example implementation.

FIG. 3B shows a timing diagram for filling fields according to another example implementation. In this example, the application 202 may present a user interface, which may be a webpage (320). The application 202 may present the user interface and/or webpage in association with a user account which the application 202 has previously authenticated, and/or in association with a user account that the operating system 228 has previously authenticated. In an example in which the application is a browser, the webpage may be associated with a domain name and/or URL. The application 202 may present the user interface and/or webpage by rendering code, such as HTML code, Java, C++, C#, or Swift, as described above.

Based on the presented webpage including one or more fillable fields 108, 112, the application 202 may determine a content type(s) of the field(s) 108, 112 (322). The application 202 may detect the fillable fields 108, 112 (322) in response to a browser application rendering a webpage, in response to a user opening and/or launching the application 202, such as on a mobile phone, or in response to a predetermined input such as pressing a home button of a smartphone or other predetermined button or input for a predetermined time and/or a minimum threshold of time, pressing a predetermined button or input twice within a maximum period of time and/or entering a predetermined gesture into a touchscreen, as non-limiting examples. The application 202 may determine the content type(s) based on text adjacent to, preceding, and/or proximal to the field(s) 108, 112 on the webpage, based on a name attribute in code for receiving a value to be entered into the field 108, 112, based on a name or type of the application, and/or based on a URL associated with the webpage, as described above.

After determining the content type (322), the application 202 may send a request 324 to a messager application 218. The request 324 may be a request for a text string(s) 160, 164 to fill the fillable field(s) 108, 112. The messager application 218 may be implemented on the same computing system 200 as the application 202, or on a remote server. The request 324 may include and/or be associated with the user account, the determined content type, the type or name of the application, the domain name, and/or the URL. The messager application 218 and/or email server may be associated with the user account.

In response to receiving the request 324, the messager application 218 may retrieve the text string(s) (326). The messager application 218 may retrieve and/or search for the text string(s) according to any of the methods, techniques, and/or functions described above such as the descriptions with respect to the searcher 210 and/or searcher 222. Upon retrieving the text string, the messager application 218 may send the text string(s) 328 to the application 202.

Based on receiving the text string(s) 328, the application 202 may fill the field 108, 112 with the text string 160, 164 (330). The application 202 may fill the field 108, 112 with the text string 160, 164 automatically, or may prompt the user, and fill the field 108, 112 with the text string 160, 164 upon approval and/or acceptance from the user.

In an example implementation in which the computing system 200 has voice calling capabilities, such as the computing system 200 being a smartphone or a computing system 200 implements Voice over Internet Protocol (VoIP), the application 202 may include the calling application and may, in response to the user placing a call to or receiving a call from an entity that maintains an account identifier for the user, determine the user's account identifier in response to the user placing or receiving the call, and present the account identifier to the user on a display of the computing system 200. The calling application and/or computing system 200 may determine the content type based on the telephone number to which the call was placed and/or from which the call was received, and may retrieve the user's account identifier based on the content type using any of the techniques described above. In an example in which a user account associated with the user is also associated with a wearable device such as a smartwatch and/or the computing system 200 is in communication with the wearable device, the computing system 200 may cause the account identifier and/or telephone number to be displayed on the wearable device while the call is ongoing in response to the user either placing the call to or receiving the call from the entity that maintains the account identifier for the user.

Figure 4:
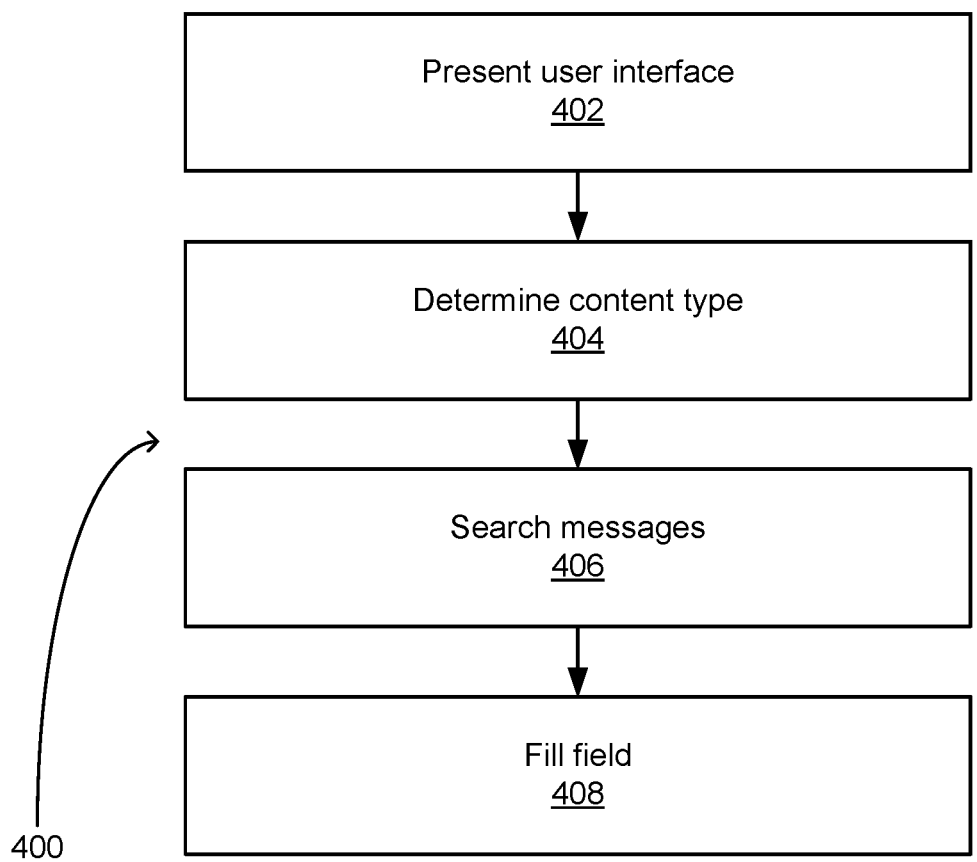
FIG. 4 shows a method for filling fields on a webpage according to an example implementation.

FIG. 4 shows a method 400 for filling fields on a user interface according to an example implementation. The method 400 may include presenting a user interface of an application in association with a user account, the user interface including at least one fillable field (402). The method 400 may include determining a content type of the at least one fillable field (404). The method 400 may include searching messages stored in association with the user account for a text string associated with the content type of the at least one fillable field (406). The method 400 may include filling the at least one fillable field with the text string (408).

According to an example implementation, the application may include a browser and the user interface includes a webpage rendered by the browser.

According to an example implementation, the webpage may include the at least one fillable field and text proximal to the at least one fillable field, and the computing system may generate the webpage based on Hypertext Markup Language (HTML) code including the text preceding an input element defining an input field for text input.

According to an example implementation, the computing system may generate the webpage based on Hypertext Markup Language (HTML) code including an input element defining an input field for text input and a name attribute, the name attribute receiving a value entered into the input field, and determining the content type may include determining the content type of the at least one fillable field based on the name attribute.

According to an example implementation, the determining the content type may include determining the content type based on a Uniform Resource Locator (URL) associated with the webpage.

According to an example implementation, the user interface may include the at least one fillable field and text proximal to the at least one fillable field, and the determining the content type may include determining the content type of the at least one fillable field based on the text proximal to the at least one fillable field.

According to an example implementation, the content type may include a password for logging into the application.

According to an example implementation, the content type may include an account identifier associated with the application.

According to an example implementation, the messages stored in association with the user account may include emails stored in association with the user account.

According to an example implementation, the searching messages may include searching for the text string adjacent to text that matches the determined content type.

Figure 5:
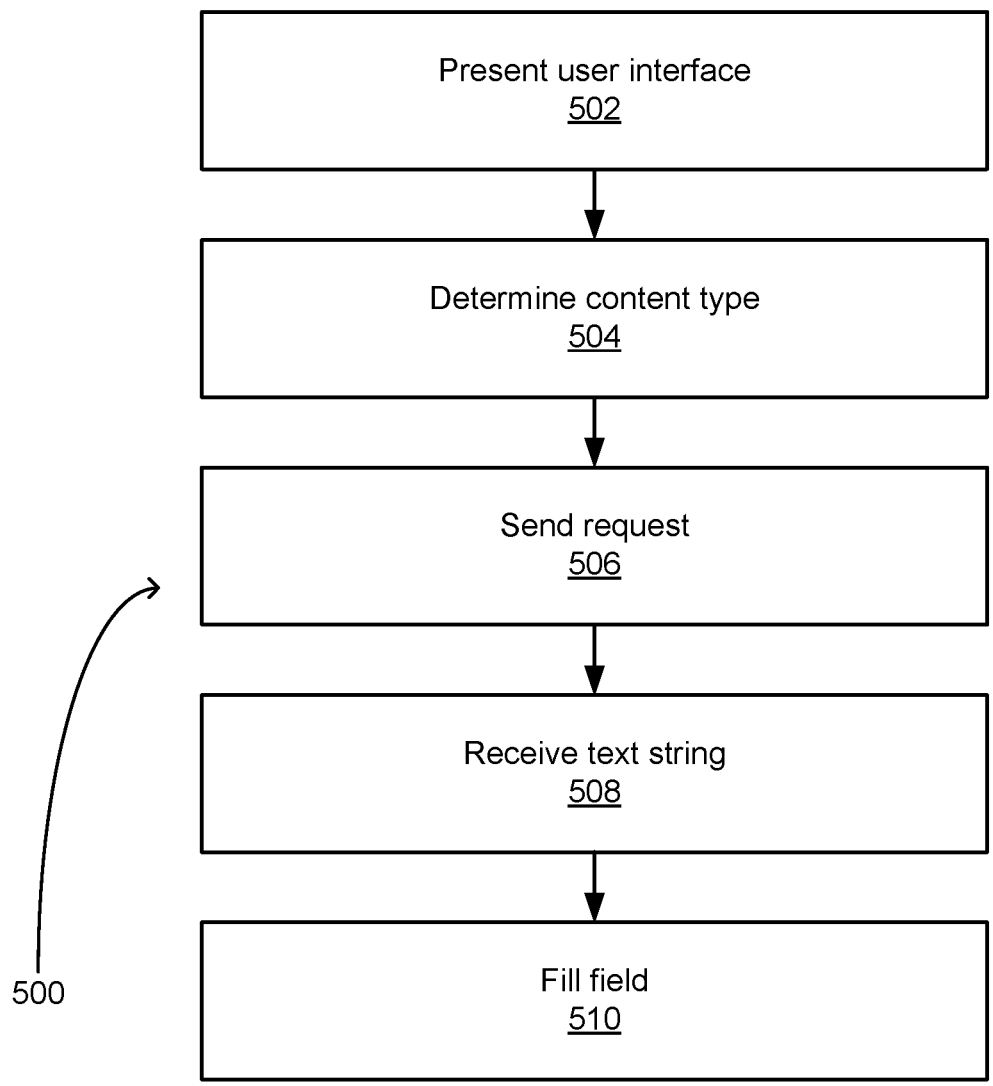
FIG. 5 shows a method for filling fields on a webpage according to another example implementation.

FIG. 5 shows a method 500 for filling fields on a user interface according to another example implementation. The method 500 may include present a user interface in association with a user account, the user interface including at least one fillable field (502). The method 500 may include determining a content type of the at least one fillable field (504). The method 500 may include sending a request to an email server associated with the user account for a text string associated with the content type of the at least one fillable field (506). The method 500 may include receiving the text string from the email server associated with the user account (508). The method 500 may include filling the at least one fillable field with the text string (510).

According to an example implementation, the user interface may include a webpage rendered by a browser.

According to an example implementation, the webpage may be associated with a domain name, and the request may include the domain name associated with the webpage.

According to an example implementation, the webpage may be associated with a domain name, and the request may include the domain name associated with the webpage and the content type.

According to an example implementation, the request may include the content type.

According to an example implementation, the sending the request may include sending the request to the email server while the user account is logged into an application presenting the user interface.

According to an example implementation, the content type may include a password for logging into an application presenting the user interface.

According to an example implementation, the content type may include an account identifier associated with an application presenting the user interface.

Figure 6:
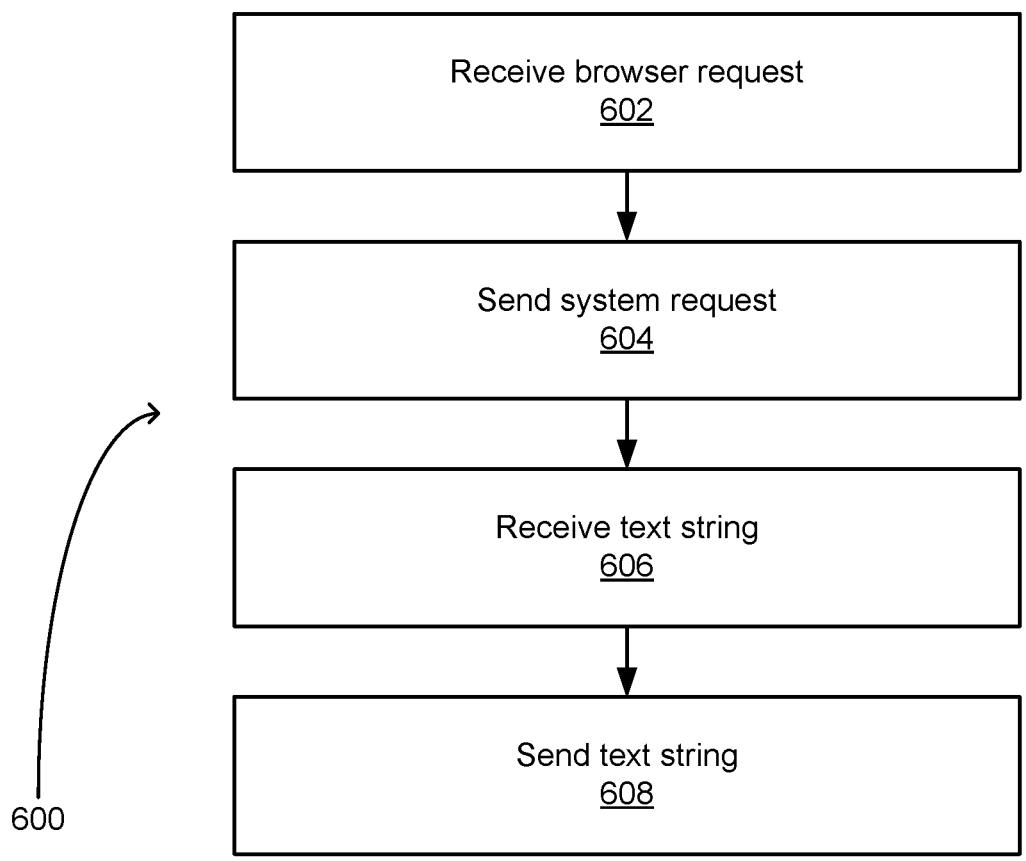
FIG. 6 shows a method for filling fields on a webpage according to another example implementation.

FIG. 6 shows a method 600 for filling fields on a webpage according to another example implementation. The method 600 may include receiving, from a browser application, a browser request for a text string, the browser request including a domain name and a content type (602). The method 600 may include, in response to receiving the browser request, sending a system request to a message application, the system request including the domain name and the content type (604). The method 600 may include receiving the text string from the message application (606). The method 600 may include sending the text string to the browser application (608).

According to an example implementation, the method 600 may further include authenticating a user account. The sending the system request may be performed in response to receiving the browser request and based on authenticating the user account.

According to an example implementation, the content type may include a password for logging into a webpage open on the browser.

According to an example implementation, the content type may include an account identifier associated with a webpage open on the browser.

Figure 7:
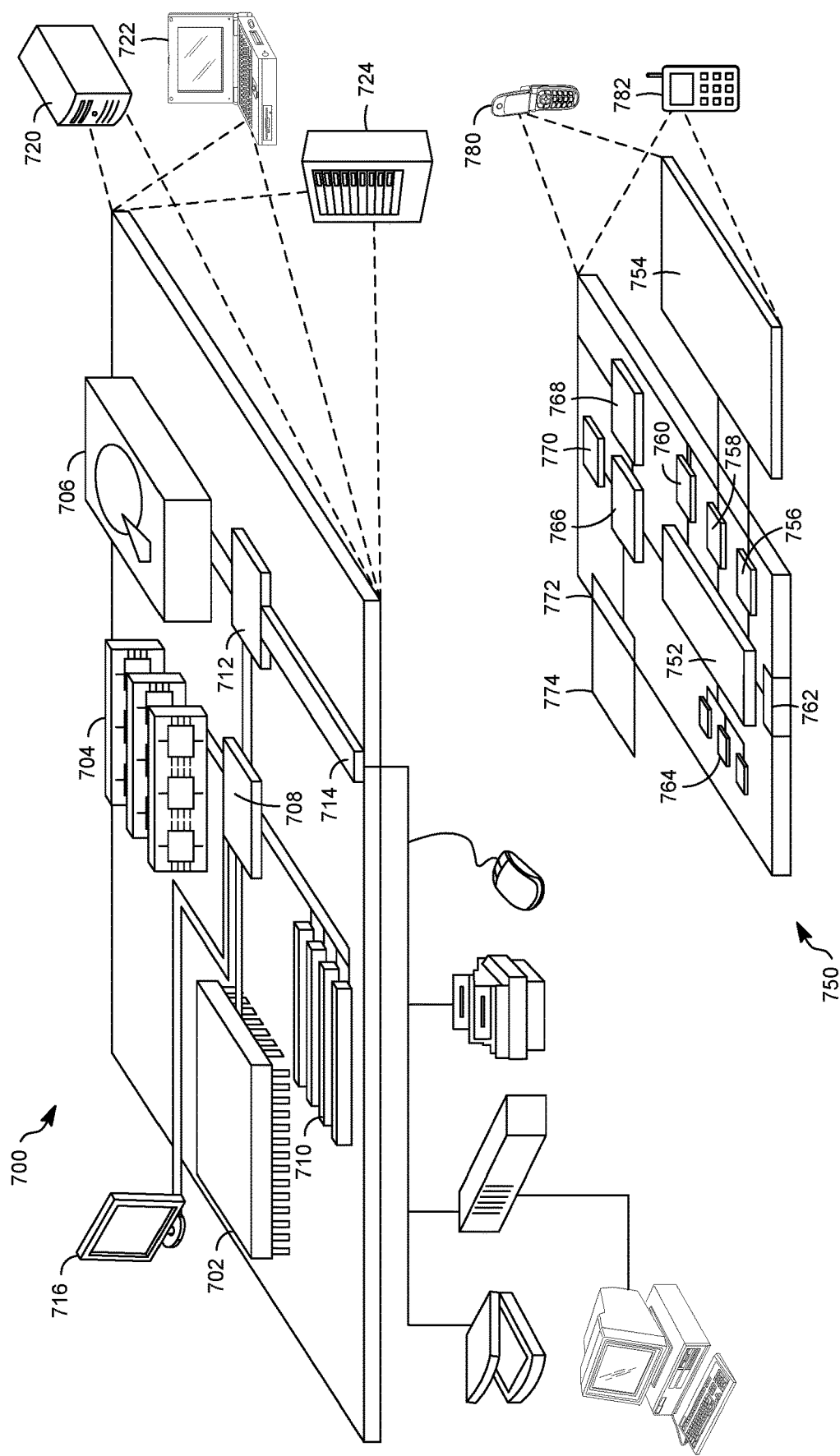
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
   generate, by a browser application based on Hypertext Markup Language (HTML) code including an input element defining an input field for text input and a name attribute, a webpage in association with a user account, the webpage including the input field via which the name attribute receives a value;
   detect the input field based on the HTML code including the input element;
   based on detecting the input field, determine, by the browser application, a content type of the input field based on the name attribute included in the HTML code;
   search, by a messager application, messages stored in association with the user account for a text string associated with the content type of the input filed, wherein the searching messages includes searching for the text string adjacent to text that matches the determined content type; and
   fill, by the browser application, the input field with the text string.

* * * * *